(12) United States Patent
Zhou et al.

(10) Patent No.: US 8,477,844 B2
(45) Date of Patent: Jul. 2, 2013

(54) METHOD AND APPARATUS FOR TRANSMITTING VIDEO

(75) Inventors: Wei Zhou, Petaluma, CA (US); Brody Kenrick, San Francisco, CA (US); Marwan Jabri, Tiburon, CA (US); Abhishek Mehrotra, Allahabad (IN); Wei Jyh Heng, Rohnert Park, CA (US)

(73) Assignee: Onmobile Global Limited (IN)

( * ) Notice: Subject to any disclaimer, the term of this patent is extended or adjusted under 35 U.S.C. 154(b) by 671 days.

(21) Appl. No.: 12/554,473

(22) Filed: Sep. 4, 2009

(65) Prior Publication Data

US 2010/0061448 A1 Mar. 11, 2010

Related U.S. Application Data

(60) Provisional application No. 61/095,587, filed on Sep. 9, 2008.

(51) Int. Cl.
*H04N 7/12* (2006.01)
(52) U.S. Cl.
USPC ............ 375/240.03; 375/240.24; 375/240.26; 386/232; 709/232
(58) Field of Classification Search
None
See application file for complete search history.

(56) References Cited

U.S. PATENT DOCUMENTS

| | | | |
|---|---|---|---|
| 5,999,525 A | 12/1999 | Krishnaswamy et al. | |
| 6,829,579 B2 | 12/2004 | Jabri et al. | |
| 7,133,521 B2 | 11/2006 | Jabri et al. | |
| 7,145,898 B1 | 12/2006 | Elliott | |
| 7,263,481 B2 | 8/2007 | Jabri et al. | |
| 7,363,218 B2 | 4/2008 | Jabri et al. | |
| 2004/0057521 A1 | 3/2004 | Brown et al. | |
| 2004/0252761 A1 | 12/2004 | Brown et al. | |
| 2005/0049855 A1 | 3/2005 | Chong-White et al. | |
| 2005/0053130 A1 | 3/2005 | Jabri et al. | |
| 2005/0111363 A1 | 5/2005 | Snelgrove et al. | |
| 2005/0201723 A1* | 9/2005 | Islam et al. | 386/52 |
| 2005/0258983 A1 | 11/2005 | Jabri et al. | |
| 2007/0106759 A1* | 5/2007 | Willie et al. | 709/219 |
| 2007/0177606 A1 | 8/2007 | Jabri et al. | |
| 2007/0177616 A1 | 8/2007 | Jabri et al. | |
| 2007/0180135 A1 | 8/2007 | Kenrick et al. | |
| 2007/0201484 A1 | 8/2007 | Kenrick et al. | |
| 2007/0291106 A1 | 12/2007 | Kenrick et al. | |

(Continued)

FOREIGN PATENT DOCUMENTS

| | | | |
|---|---|---|---|
| WO | WO 2007/145137 A1 | * | 12/2007 |
| WO | WO 2007145137 | * | 12/2007 |
| WO | WO 2008/098249 A1 | | 8/2008 |

OTHER PUBLICATIONS

Rey et al., RTP Payload Format for 3rd Generation Partnership Project (3GPP) Timed Text, Feb. 2006, RFC 4396, pp. 1-56.*

(Continued)

*Primary Examiner* — Ayaz Sheikh
*Assistant Examiner* — Nicholas Sloms
(74) *Attorney, Agent, or Firm* — Hoffmann & Baron, LLP

(57) ABSTRACT

A method of transmitting a coded media frame comprises determining a plurality of media frame sizes including a media frame size, transmitting an element comprising the plurality of media frame sizes, and thereafter receiving an input media frame. The method also includes processing the input media frame according to the media frame size to provide a coded media frame, and transmitting the coded media frame.

14 Claims, 12 Drawing Sheets

U.S. PATENT DOCUMENTS

2008/0152006 A1* 6/2008 Chen et al. ............... 375/240.13
2008/0195761 A1   8/2008 Jabri
2008/0253463 A1* 10/2008 Lin et al. .................. 375/240.25
2011/0246603 A1* 10/2011 Lee .............................. 709/217

OTHER PUBLICATIONS

U.S. Appl. No. 12/661,468, filed Mar. 16, 2010, Jabri.

International Search Report for PCT Application No. PCT/US2008/053605, mailed on May 23, 2008, 2 pages.

Written Opinion for PCT Application No. PCT/US2008/053605, mailed on May 23, 2008, 6 pages.

Non-Final Office Action for U.S. Appl. No. 12/029,119, mailed on Mar. 12, 2010; 11 pages.

* cited by examiner

The number of total video samples = 100
Frame rate = 10 fps

| The Pattern of Sample's sizes Number of samples in the group = 5 ||
|---|---|
| Predetermined sample size 1 | 4000 |
| Predetermined sample size 2 | 1000 |
| Predetermined sample size 3 | 1300 |
| Predetermined sample size 4 | 1500 |
| Predetermined sample size 5 | 1700 |

The number of total audio samples = 500
Audio frame duration = 20 ms

Audio codec type: AMR
Bit rate = 12.2k
Audio sample size = 32

| Parameters in Moov | Parameters in Moov |
|---|---|
| Duration of the file | 10 Seconds |
| Video Track | |
| Duration of the video track | 10 Seconds |
| Size of sample 1 | Size of sample 1 |
| Size of sample 2 | Size of sample 2 |
| Size of sample 3 | Size of sample 3 |
| Size of sample 4 | Size of sample 4 |
| Size of sample 5 | Size of sample 5 |
| Size of sample 6 | Size of sample 6 |
| Size of sample 7 | Size of sample 7 |
| Size of sample 8 | Size of sample 8 |
| ⋮ | ⋮ |
| Size of sample 96 | Size of sample 96 |
| Size of sample 97 | Size of sample 97 |
| Size of sample 98 | Size of sample 98 |
| Size of sample 99 | Size of sample 99 |
| Size of sample 100 | Size of sample 100 |
| Audio Track | |
| Duration of the audio track | 10 seconds |
| Size of sample 1 | 32 |
| Size of sample 2 | 32 |
| Size of sample 3 | 32 |
| Size of sample 4 | 32 |
| Size of sample 5 | 32 |
| Size of sample 6 | 32 |
| ⋮ | ⋮ |
| Size of sample 496 | 32 |
| Size of sample 497 | 32 |
| Size of sample 498 | 32 |
| Size of sample 499 | 32 |
| Size of sample 500 | 32 |

FIG. 5

METHOD AND APPARATUS FOR TRANSMITTING VIDEO

CROSS-REFERENCES TO RELATED APPLICATIONS

This application claims priority to U.S. Provisional Application No. 61/095,587, filed 9 Sep. 2008, the disclosure of which is incorporated herein by reference in its entirety for all purposes.

BACKGROUND OF THE INVENTION

This invention relates generally to the field of telecommunications and broadcasting, and particularly addresses digital multimedia processing for transmission over telecommunications networks. In particular the invention describes various methods and apparatuses that can be used to transmit media, and in particular video, for use in a variety of situations. In particular, the invention describes a method for transmission of media coded according to patterns. Further, the invention describes transmitting media for progressive download of a 3GP file.

Present networks such as Third Generation (3G) mobile networks, broadband, cable, DSL, Wi-Fi, and WiMax networks allow their users access to a rich complement of multimedia services including audio, video, and data. Other networks such as Next Generation Networks, 4G and Long Term Evolution (LTE) will continue this trend in media rich communication.

The typical user desires that their media services and applications are seamlessly accessible and integrated between services as well as being accessible to multiple differing clients with varied capabilities and access technologies and protocols in a fashion that is transparent to them. These desires will need to be met in order to successfully deliver some revenue generating services and to ensure branding of services across an operator/provider's various networks.

Different service providers may employ different network technologies or a combination of network technologies to expand access capabilities to the widest range possible of users and user experiences. A challenge is the adaptation of media to cater to differing networks capabilities so they can be offered with an attractive user experience to users with varying access capability which may depend on the location of the user (e.g. at home on the web) or mobile (e.g. commuting), or wireless (e.g. in an internet café). Network capabilities can also be augmented.

The range of devices currently available that connect to the services have a large range of inherent capabilities and further have many of these capabilities reduced by a particular environment. Delivering to those abilities or overcoming the inherent deficiencies or situational deficiencies of a device in order to provide high quality services to the user of the device is also of increasing importance. Certain devices may only receive media using a specific delivery technology or a subset of a delivery technology. In particular, certain devices handle RTSP streaming which is well suited to deliver stored and live content and certain other devices handle HTTP streaming (also known as progressive download) which is well suited to deliver stored content but not live content. Certain devices or networks may only be able to receive or transmit data at a constant bit rate. Certain devices may also have specific restrictions when accessing a particular kind of media such that they only operate using a proper subset of a particular standard.

With the desire of service providers to offer various multimedia applications, both live and stored content, to the widest user base and without hindrance on various access methods (broadband fixed, wireless, mobile), technologies (DSL, Cable, Edge, 3G, Wi-Fi, 4G, WiMax, LTE), access protocols (RTSP, SIP, HTTP) and devices, there is a need in the art for improved methods and systems for receiving and transmitting multimedia information between multimedia telecommunications networks and devices.

SUMMARY OF THE INVENTION

This invention relates to methods, systems and apparatuses that provide multimedia to users of a multimedia device. Embodiments of the present invention have many potential applications, for example and without limitations the providing of media to devices that would otherwise not be able to access them, either from a protocol or media standards incompatibility, the ability to provide live media in spite of media and/or signaling and/or media container/delivery format constraints, the delivery of constant bit rate media, the delivery of media according to a desired pattern, the exploitation of statistical multiplexing of media and others as described more fully throughout the present specification.

Many benefits are either enabled or achieved by way of the present invention over conventional techniques. For example, embodiments of the present invention provide for the delivery of live media streams using containers that do not cater for continuous live streams. Other embodiments of the present invention provide for the delivery of constant bit-rate media where not only the overall bit-rate is constant, but also where bit-rates of intra-frames and predictive-frames are constant. As a result, media can be delivered to devices, or in situations, that do not have the ability to deal with variable size media chunks.

Other embodiments of the present invention provide highly computationally efficient iterative compression techniques, the re-use of motion vectors to save processing and an accurate quality parameter estimation to reduce overall encoding costs.

According to an embodiment of the present invention, a method of transmitting a coded media sample is provided. The method includes determining a plurality of sample sizes including a sample size and transmitting an element comprising the plurality of sample sizes. The method also includes thereafter, receiving a media sample and coding the media sample according to the sample size to provide a coded media sample. The method further includes transmitting the coded media sample.

According to another embodiment of the present invention, a method of producing coded media is provided. The method includes determining a media coding pattern comprising a plurality of sample sizes. The method also includes producing a plurality of coded media samples in accordance with the plurality of sample sizes.

Depending upon the embodiment, one or more of these benefits, as well as other benefits, may be achieved. The objects, features, and advantages of the present invention, which to the best of our knowledge are novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE DRAWINGS

FIG. 5 illustrates an example of generating dummy "moov" box according to an embodiment of the present invention;

DETAILED DESCRIPTION OF THE INVENTION

Figure 1:
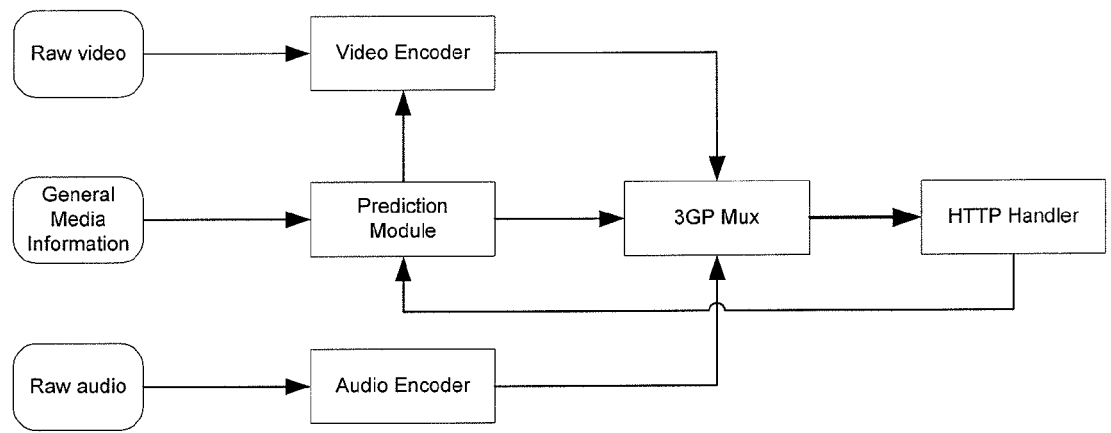
FIG. 1 illustrates an architecture according to an embodiment of the present invention.

A Multimedia/Video Adaptation Apparatus (and methods pertaining to it) is described in U.S. patent application Ser. No. 12/029,119, filed Feb. 11, 2008 and entitled "METHOD AND APPARATUS FOR THE ADAPTATION OF MULTIMEDIA CONTENT IN TELECOMMUNICATIONS NETWORKS", the disclosure of which is hereby incorporated by reference in its entirety for all purposes. The platform allows for the deployment of novel applications and can be used as a platform to provide device and network optimized adapted media amongst other uses. The disclosure of the novel methods, services, applications and systems herein are based on the Dilithium Content Adaptor platform. However, one skilled in the art will recognize that the methods, services, applications and systems, may be applied on other platforms with additions, removals or modifications as necessary without the use of the inventive faculty.

References

[1] ISO/IEC 14496-12:2005 Information technology—Coding of audio-visual objects—Part12: ISO base media file format
[2] ISO/IEC 14496-14, Information technology—Coding of audio-visual objects—Part 14: MP4 file format
[3] ISO/IEC 14496-14, Information technology—Coding of audio-visual objects—Part 15: AVC File format
[4] 3GPP TS 26.244 V7.0.0 3GPP file format
[5] 3GPP2 C.S0050-B Version 1.0, 18 May 2007, 3GPP2 Formats for Multimedia Services Media Delivery Media is typically transmitted using either a variable bit-rate (VBR) or a constant bit-rate (CBR) approach. In many situations constant bit-rate is preferred as it limits the bandwidth required to deliver the media while achieving some target media quality. When CBR is used, a target in kilobits per second (kbps) is set for the bitrate. For example, video bitstreams could be transmitted in CBR mode at 44 kbps, 64 kbps, etc. CBR is more challenging than VBR because of the stringent limitation on the target bitrate.

Video codecs such as ITU-T Recommendation H.261, H.263, and H.264 and MPEG4-part2 encode a video sequence to produce bitstreams that contain I-frames (intra-coded frames) and P-frames (predicted frames). I frames are self-contained, whereas P frames depend on previous (or in some cases future) frames. The number of bits allocated to I-frames and P-frames are controlled in various ways, chiefly, through a quantization parameter commonly referred to as QP. The output of such a video encoder can be thought of as a sequence of I and P frames. For example the "pattern" I.P.P . . . P.I is such a sequence, where the number of P frames between two I frames can vary (key frame interval). The number of bits or bytes required by an I or a P frame can be called the sample size.

The most common approaches to delivering media content over packet switched networks such as the internet are real-time streaming and progressive download. Real-time streaming utilizes Real-Time Transport Protocol/Real-Time Streaming Protocol (RTP/RTSP) to deliver content from a streaming server to a client. Media is played, but typically not stored beyond some buffering, by the client software. Progressive download allows users to play media as it is being downloaded from a web server. Real-time streaming is often preferable to progressive download for webcasts of live events, delivery of long-form video and 24/7 internet radio and TV channels. However, for some user devices that do not support RTSP streaming, such as iPhone from Apple incorporated, the HTTP progressive download is the only option.

The ISO base media file format [1] is a general file format forming the basis for a number of other more specific file formats. This format contains the timing, structure, and media information for time sequences of media, such as audio/visual presentations. Some extensions and variations of the ISO base media file format are MP4, MOV, 3GPP and 3GPP2 [2][3][4][5]. 3GPP and 3GPP2 file formats are defined by the $3^{rd}$ Generation Partnership Project and $3^{rd}$ Generation Partnership Project 2 respectively. These standards seek to provide uniform delivery of rich multimedia over recent and newly evolved, broadband mobile networks ($3^{rd}$ generation networks) to the latest multimedia-enabled wireless devices.

A progressive download profile 3GPP/3GPP2 file normally comprises three ISO base media boxes: "ftyp", "moov", and "mdat". The "ftyp" box defines file type and compatibility, which is normally pre-determined. The "moov" box describes how the video or audio data is stored. The "mdat" box contains the video data or audio data.

The following steps describe an example of how to generate a 3GPP file in the traditional way.

1. Create an "ftyp" box.
2. Create an "mdat" box. Parse the video and/or audio bitstream to collect information including the number of video or audio frames, the size of each audio and video frame, the codec type, the duration of the media, and the total size of the media and so on. The audio or video frames are then added into the "mdat" box. They can be interleaved depending on desire. The offset of each audio or video frame in the 3GPP file is recorded.

3. With all the information collected in step 2, the 3GPP file multiplexer (mux for short) will create and write "moov" box.

In the traditional approach, the "moov" box can only be generated when the media information of the whole sequence is collected. Depending on the profile of the 3GPP file, the position of the "moov" box in the file can be before or after "mdat" box. For progressive download or streaming profile, the "moov" box is placed before the "mdat" box as the de-multiplexer (demux for short) will not be able to de-multiplex "mdat" until having the information in the "moov" box.

However, this approach is not useful for streaming live content (i.e. TV). For live streaming applications, the 3GPP file has to be generated on the fly. Waiting to collect enough media information to generate the "moov" box at the end of the stream will delay the delivery of the content. This means the transmission must be delay for the duration of the live feed and is not acceptable in a live service. The movie fragmented box specified in [1] is provided to avoid such a long delay, but it is not supported by some user devices, such as iPhone.

FIG. 1 depicts a system architecture for generating a 3GPP file on the fly for HTTP progressive download. Instead of collecting all media information and then generating the "moov" box at the end, concept of the system is of generating a dummy "moov" box at the start, before having all the media information, and transmitting the dummy "moov" box, and then controlling the generation and multiplexing of the media for the "mdat" as defined in the already transmitted dummy "moov" box.

In the system, the audio and video encoder can respectively take raw audio and video signals and encode it to audio and video bitstreams. The 3GPP mux will multiplex the audio and video bitstreams and generate 3GPP file for HTTP server. The user device can access the generated file through normal GET request or partial GET request. The prediction module is to provide media information for constructing dummy "moov" box and controlling the encoders. The invention is not limited to using encoders alone and smart transcoders that avoid the use of a raw media stage are used in some embodiments.

The media information used for constructing the "moov" box includes:

The number of total samples, meaning the number of video or audio frames;

The data length of every sample, meaning the number of bytes for encoding every video frame or one audio frame;

Timing information, e.g. frame rate; and

Media coding information, e.g. codec type, profile, level, bit rate, sampling rate.

Figure 2:
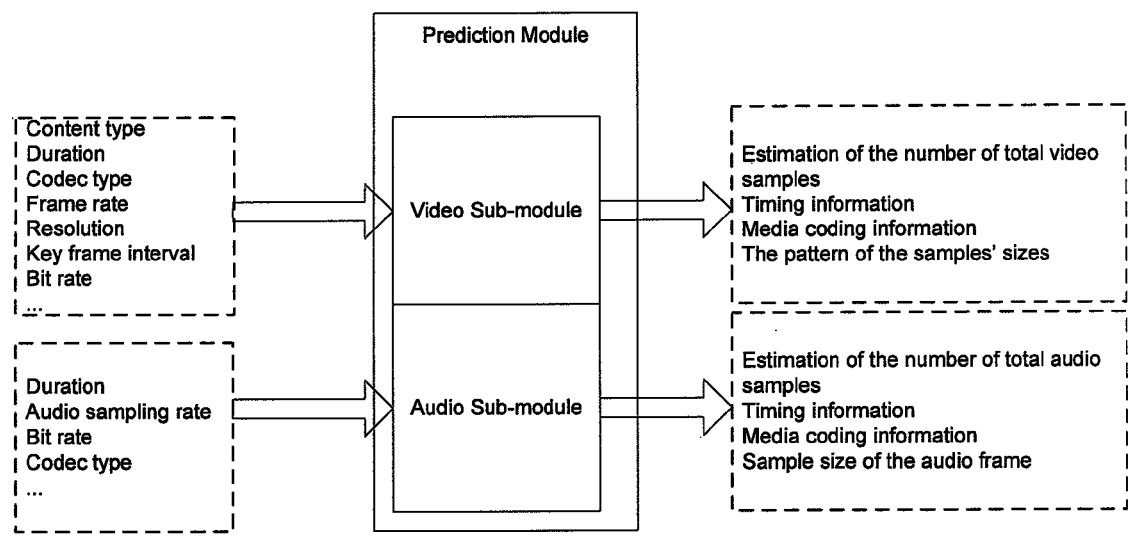
FIG. 2 illustrates a prediction module according to an embodiment of the present invention.

FIG. 2 depicts the prediction module that produces the media information needed for the 3GPP mux and video/audio encoder. The prediction module includes two sub-modules, with one for audio and another one for video.

The inputs for audio sub-module can be duration, audio sampling rate, and the audio encoding parameters such as bit rate and codec type. The outputs of the audio sub-module will include the estimation of the number of total audio samples, the timing information, the media coding information, the sample size of the audio frame. For most audio encoders, if the encoding bit rate and sampling rate are determined, the sample size of the audio frame is also determined and all the audio frames have the same sample size. For example, the size of audio frame encoded by GSM-AMR encoder at bit rate of 12.2 kbps with 8000 Hz sampling rate is always 32 bytes.

Figure 3:
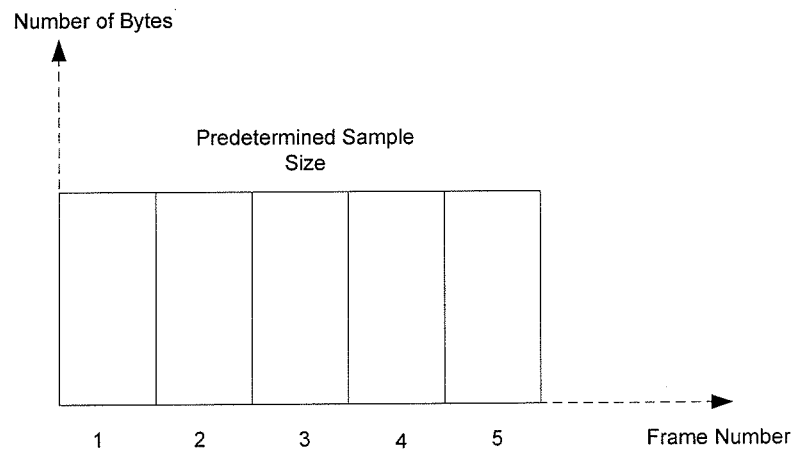
FIG. 3 illustrates an example of a pattern of sample sizes with the same values according to an embodiment of the present invention.
Figure 4:
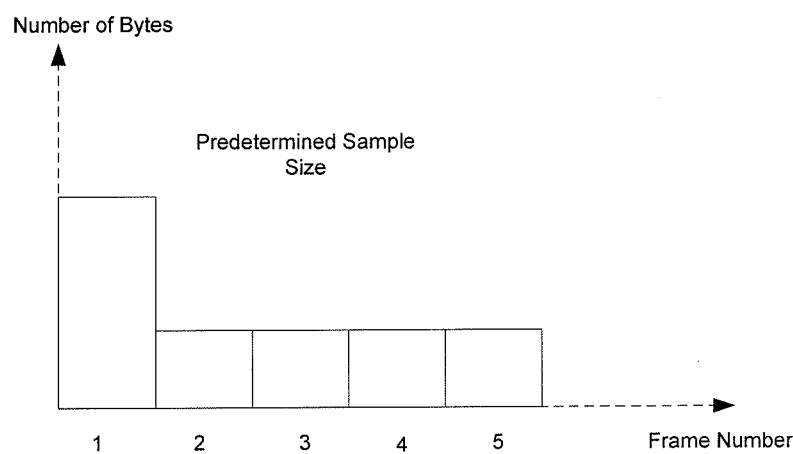
FIG. 4 illustrates an example of a pattern of sample sizes with different values according to an embodiment of the present invention.

The inputs for the video sub-module can be content type, duration, and the video encoding parameters such as codec type, frame rate, resolution, key frame interval, and bit rate. The outputs of the video sub-module can include the estimation of the number of total video samples, the timing information, the media coding information, the pattern of the samples' sizes. The pattern of the samples' sizes contains the predetermined sample sizes for a group of samples. One example of the pattern of the samples' sizes is shown in FIG. 3. In the example, the same value is predetermined for all the samples. The group size here is one. FIG. 4 shows another example of the pattern of the samples' sizes. In the example, the size of the first sample is different while the rest of the samples in the group have the same sample size.

The sample size pattern can be determined from the general video information such as types of video: news, sports or music TV, video resolutions, frame rate, and key frame interval. It can also be determined dynamically by analyzing the characteristics of the video at the start of the session.

To construct the "moov" box, the values of the parameters to be calculated are based on the media information such as: duration of the file, duration of the audio track, duration of the video track, the sample size of every sample, number of chunks in the file, number of samples in each chunk, and the offset of each chunk in the file shows how these values of the parameters are calculated based on the information from the prediction module.

The duration of the file is equal to the bigger one of the duration of the audio track and duration of the video track. The duration of the audio track is calculated from the total number of audio samples and the audio timing information. The duration of the video track is calculated from the total number of video samples and the video timing information. Normally, the three durations are the same. The duration can also be decided independently of the content and without knowledge of the content.

The sample size of every sample in the video track of the "moov" box is derived from the pattern of the samples' sizes. The pattern of the samples' sizes is mapped to the samples' size from the first sample size in the video track of the "moov" box periodically to the last sample size. Of course, other patterns or non-periodic uses are possible, but the advantage of the pattern repetition is that the encoding facility might be able to use the information in the pattern to produce more efficient encodings.

The sample size of every sample in the audio track of the "moov" box is the same as the sample size of the audio frame from the prediction module.

After determining the total number of samples and the sample size of every sample, the number of chunks in the file, the numbers of samples in each chunk, and the offset of each chunk in the file can be calculated as specified in [1].

FIG. 5 shows an example of how the values in the "moov" box are associated with the media information from the prediction module. In this example, the prediction module has determined the media information. The total number of video samples in this example is 100. The video frame rate is 10 FPS. The sample size pattern has five elements, and starting from the first one to the last they are 4000, 1000, 1300, 1500, 1700 bytes. For the audio media information, the total number of the audio samples is 500. The duration of each audio frame is 20 ms. The sample size of every frame for GSM-AMR encoded at 12.2 kbps is 32 bytes. With the media information, the 3GPP mux can derive that the duration of the file, the duration of the video track, the duration of the audio track are all equal to 10 seconds.

The first video sample size in the video sample size pattern is mapped to the first sample size in the video track of the "moov" box. The $2^{nd}$, $3^{rd}$, $4^{th}$, and $5^{th}$ video sample size in the video sample size pattern are respectively mapped to the $2^{nd}$, $3^{rd}$, $4^{th}$, and $5^{th}$ sample size in the video track of the "moov"

box. Then, the five sample sizes in the video sample size pattern will be mapped to the next five sample sizes in the video track of the "moov" box in the same way. The process will continue until all the sample sizes in the video track of the "moov" box are set.

After the dummy "moov" box is constructed, it will be sent to the user device through HTTP handler (the transmission is likely in response to one or more GET requests from the client). Then, the 3GPP mux will start to construct the "mdat" box. As the "moov" box has been sent already and it cannot be changed, the media in the "mdat" box has to be arranged in the way specified by the dummy "moov" box. In other words, every video sample must have the same sample size as the corresponding sample size in the dummy "moov" box.

Figure 6:
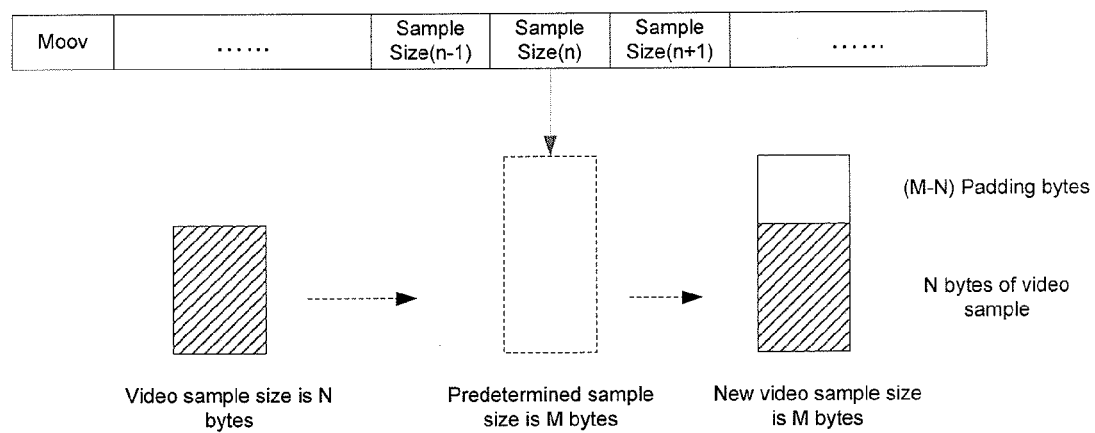
FIG. 6 illustrates a padding of a video sample according to an embodiment of the present invention.

FIG. 6 shows one way in which this can be done for one video sample. When the 3GPP mux receives a new video sample from the video encoder and the sample size is N bytes, the 3GPP mux will find that M bytes are used in the corresponding sample size in the dummy "moov" box. If M is greater than N, (M-N) bytes of padding bytes will be appended to the end of the video sample. The padding bytes will be something that will not affect decoding. Alternatives to cleanly padding are to insert rubbish or error bits that can be ignored by the decoder but this may cause interoperability issues and is less desirable.

Figure 7:
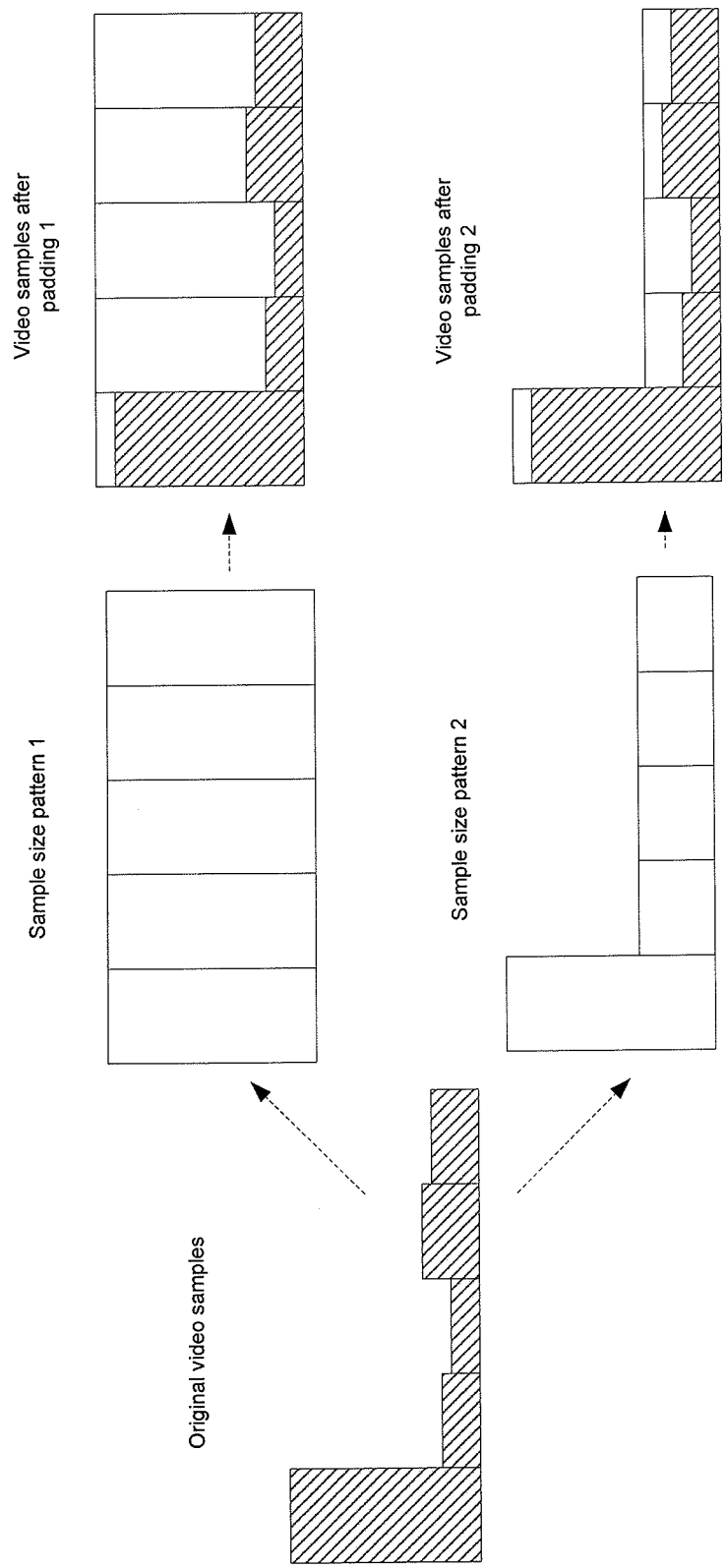
FIG. 7 illustrates a padding of video samples according to an embodiment of the present invention.

FIG. 7 shows how a group of the video samples from the video encoder are changed when the patterns of the samples' size in FIG. 3 and FIG. 4 are used respectively.

It can be seen that the pattern of the samples' sizes in FIG. 4 is more efficient because there are fewer padding bytes in the final video samples. Various patterns may be useful here to achieve greater efficiencies. For example the large sample size could be used for intra coded frames and the remaining for inter coded frames.

Figure 8:
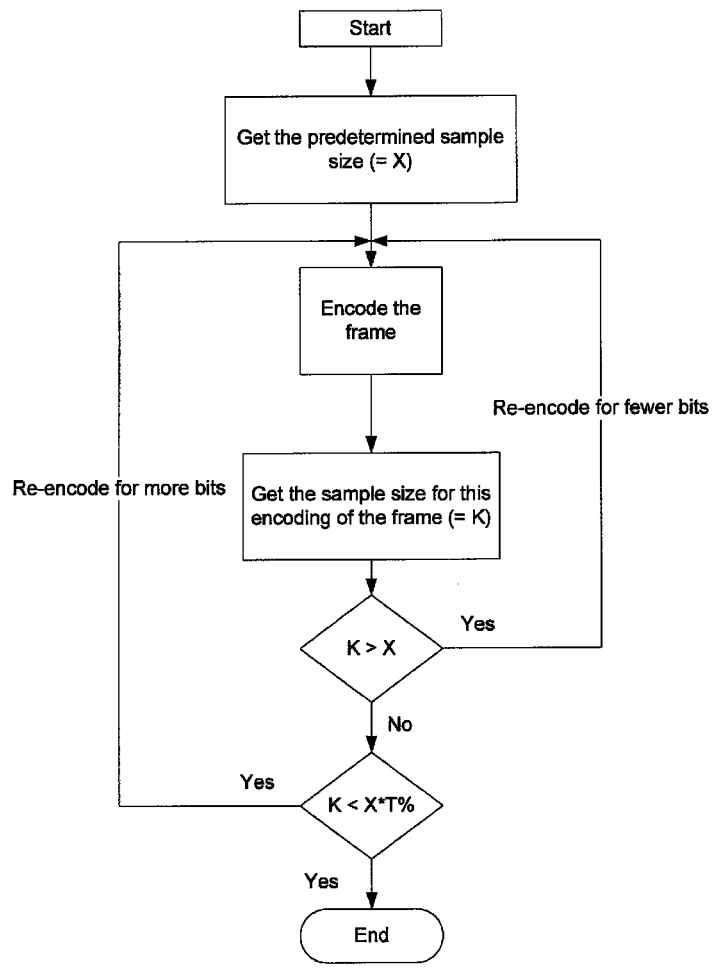
FIG. 8 illustrates controlling a video encoder according to an embodiment of the present invention.

It could happen that a video sample size is greater than the predetermined corresponding sample size in the "moov" box. On the other hand, it is also possible that a video sample size is much smaller than the predetermined corresponding size. In this case, the 3GPP mux is less efficient as there are more padding bytes. It is beneficial for efficiency to control the video encoder to avoid the above two cases. FIG. 8 shows another embodiment in which the video encoder is controlled to produce a video sample in which the sample size is close to, but not greater than the predetermined sample size. Before one video frame is encoded, the corresponding predetermined sample size will be found out. After the encoding of the video frame is finished, assume that the number of bytes used for encoding the frame is K and the predetermined sample size is X. If K is far smaller than X, for example, K<X*10%, the frame should be re-encoded for more bits. If K is greater than X, the frame should be re-encoded for fewer bits.

There are many further techniques that can be used to achieve better video quality by better utilizing the predetermined sample size.

One of embodiment is to combine rate control and scene change detection. Scene change detection can detect the major change in video that normally cause bit rate burst in encoding, so that the rate control can change the encoding strategy accordingly.

Another techniques is to adjust encoding QP at the macro block (MB) level and the frame level if more bits or fewer bits are required for encoding the frame.

Another embodiment is to determine the Region of Interest (ROI) before encoding, so that more bits can be allocated for encoding the ROI. The ROI can be determined by the content types like news, sports, or music TV.

Another embodiment is to do multi-pass bitrate control. The multi-pass bitrate control can form a sliding window to analyze one or more frames. The target number of bits for each frame in the window can be determined and it can be appropriately adjusted according to the predetermined bits budget in the future pass.

Another embodiment is to allocate encoding bits based on the texture analysis of the video. The regions have more texture information can have higher weighting factor in encoding bits allocation. Note that the texture analysis can be used in the context of determining a ROI, to encode with more bits or less bits a ROI with complex texture. For example in a basket ball game, the high texture areas may not be as interesting as viewers tend to focus more on the court, players and more importantly on the ball. Therefore, the low texture area of the basketball court is significantly more important to reproduce for an enhanced quality of experience.

Another embodiment is to do B-frame-like (bi-directionally predicted) encoding even for a codec that does not support B-frames, because features of the pattern are known and delay can be added (or simply taken advantage of) such that media can be looked ahead and the effects of decisions can be propagated and various parts of the image can be compensated and or designed to increase quality. Although this technique resembles a B-frame predictive coding, the produced bitstream is a valid bitstream without any B-frame like encoding and the decoder and even the codec need not support it. If B-frames are permitted in the session this technique may be utilized in conjunction with actual B-frames in order to gain the best coding efficiency.

Other embodiments might use the temporal pattern to encode a particular frame or subset thereof in a particular way with the knowledge that a later frame will have fewer or more bits that might allow for a strategy that will be compensated for in subsequent frames or one that needs to try and setup a particular advantageous situation for a later frame.

A further embodiment might use the target sample size for a particular frame and aim to achieve the target size without re-encoding the entire frame. This can be achieved by storing a superposition of data for elements in the frame, for example multiple block types or coefficients. In an embodiment, a frame is processed but the bitstream is not generated immediately for each block/macro block. Instead, all coefficients for the frame are kept before applying QP and run length encoding in an optimized/weighted fashion at the end to produce the bitstream for the frame. Various strategies may be employed to achieve as close as possible to the target rate on a first pass but if this is not achieved then rather than re-encoding the frame and re-calculating the coefficients the stored coefficients are used and the QP is modified to achieve the desired rate. In this way, gross level control or fine-tuning can be applied to various parts of the image to achieve the target sample size in a way that can be terminated exactly upon achieving the bit rate. Also multiple attempts/results may be tested with significantly less processing than would be required for encoding the entire frame which would allow for less distortion overall. The technique can also be extended across multiple frames and take into account the pattern and regions of interest.

Additionally, it is also understood that this invention involving patterns is broadly applicable in media adaptation and is not only applicable to the case where a media container format requires a pre-media transmission of sample sizes or other information. It is applicable to audio, and not only video, as well as other media types. It is also applicable in other situations to achieve constant bitrate or bits in frames for media with a particular pattern targeted, which allows for predictable behavior and also allows for advantage of multiple channels to more efficiently share resources. For example, to apply the technique in a situation where the media need not be using the pattern for a protocol related reason, a base station might indicate on a particular pattern for each channel to use such that there is no overlap of large samples (such as intra coded frames) and a multiplexing efficiency can be guaranteed in much the same way that statistical multiplexing offers advantages.

The various boxes in the 3GPP file, e.g. "moov", can also be compressed to save on transmission time of this upfront information that would delay playback and degrade the user experience.

Figure 13:
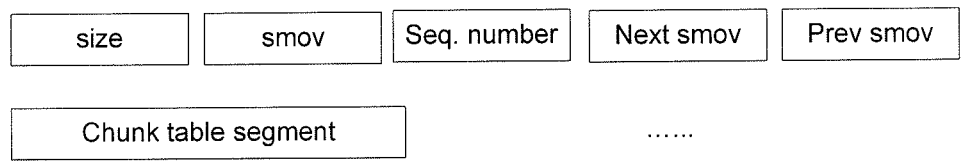
FIG. 13 illustrates a segmented "moov" box format according to an embodiment of the present invention.

A further embodiment allows for a more timely transmission of the "moov" box for a file container. The "moov" box is segmented to reduce the initial overhead of the file header which can be significant when the file duration is long. Without "moov" segmentation, a one-hour video sequence can result in at least a few seconds to minutes of download time for the "moov" data at the beginning of a progressive download leading to delay before playback. FIG. 13 illustrates an example of the "moov" box segment format. The segmented "moov" is referenced as "smov". Each "smov" segment can appear periodically in the media data, or at such a time when the previous segment is known to be completed. The overall content can be a continuation of the content as "moov". The "smov" type follows the size field of the "smov" segment. It is followed by a sequence number (Seq. number) of the particular "smov" segment, which monotonically increases. It is followed by the next "smov" starting address or offset, and is in turn followed by the previous "smov" starting address or offset. All segments can exist in a compressed form as well referred to as compressed segmented "moov" or "csmv".

Further embodiments also produce outputs according to additional container formats with bitstreams according to the techniques described throughout the present application. The container formats that can receive advantages of these techniques include, but are not limited to, FLV, 3GP, 3GP2, MP4 and MOV.

An embodiment of the invention provides a method for estimating a quantization parameter for encoding a frame with a targeted number of bits. This method can be used by itself or can be used in an iterative encoding method as further detailed throughout the present specification. One such iterative encoding can be encoding a frame again after the previous iteration of encoding in order to have a different bitstream size, which can be achieved by encoding with a different quantization parameter. A simple technique of adjusting QP is to increase or decrease it with the smallest magnitude, for example 1, until the target is reached, but it can also significantly increase the computational cost of the encoding process. The key challenge, and an important benefit of the present invention, is reducing the computational cost of iterative encoding while maintaining video quality.

One embodiment of the invention proposes a technique that provides an accurate QP value in order to minimize the number of iterations. A general relation between bitrate and QP is that smaller QP provides finer quantization level thus it gives better quality as well as higher bitrate. One fact for some video encoders such as H.264/AVC is that the relation between bitrate and QP is not linear. The reason is that QP denotes the quantization scale indirectly, whereas the quantization step size is the true value used in quantization.

In H.264/AVC, the relation between QP and QP step size is $Q_{step}=2^{(QP-4)/6}$, thus bitrate is not linearly related to QP, but we can always calculate QP from $Q_{step}$. The relation between bitrate and $1/Q_{step}$ can be more accurately characterized by a linear model rather than the relation between bitrate and 1/QP.

The linear model between bitrate and quantization step size is $R=(K*SAD)/Q_{step}+C$, where R is the estimated number of coded bits of a frame, K is the rate distortion parameter and differs for different types of picture, and C is the number of bits used to code header information. $(K*SAD)/Q_{step}$ reflects the number of bits used to code the transformed residual.

If encoding a frame again with the same picture type, K is a constant. SAD is the sum of absolute different between the current frame and the reference frame and it can be approximately considered as a constant. C can be also approximated as a constant because most of encoding modes (e.g. macroblock types) remain unchanged when re-encoding. Therefore, the rate can be considered to vary with the $1/Q_{step}$ linearly. The linear model can be further simplified as $R=G*(1/Q_{step})+C$, where G is a prediction gradient. Two data points can be used to determine a linear model. To determine this linear model, two data points: number of coded bits and $Q_{step}$ can be used to calculate linear parameters G and C.

Figure 9A:
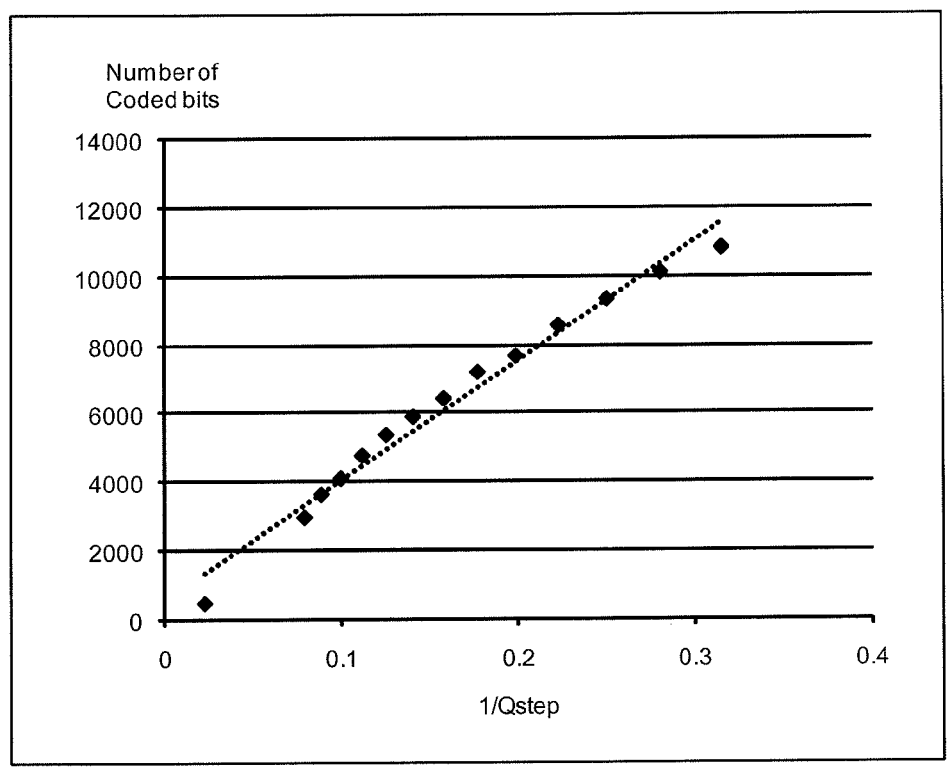
FIG. 9A illustrates an approximately linear relationship of the number of bits to the inverse of $Q_{step}$ inside a frame according to an embodiment of the present invention.

FIG. 9A drawn using data obtained from a video clip shows the number of bits used to code a frame by using different values of $Q_{step}$ in H.264. The points represent the values of samples and the trend line shows the approximately linear relationship. It can be seen that most data points have a very close match to the trend line, the exception being those values with $Q_{step}$ at either end of the range of $Q_{step}$. The range of $Q_{step}$ that gives close match can be termed the prediction safe range and the $Q_{step}$ in this range as prediction safe $Q_{step}$. The linear model is more accurate if the $Q_{step}$ is in the prediction safe range.

Figure 9B:
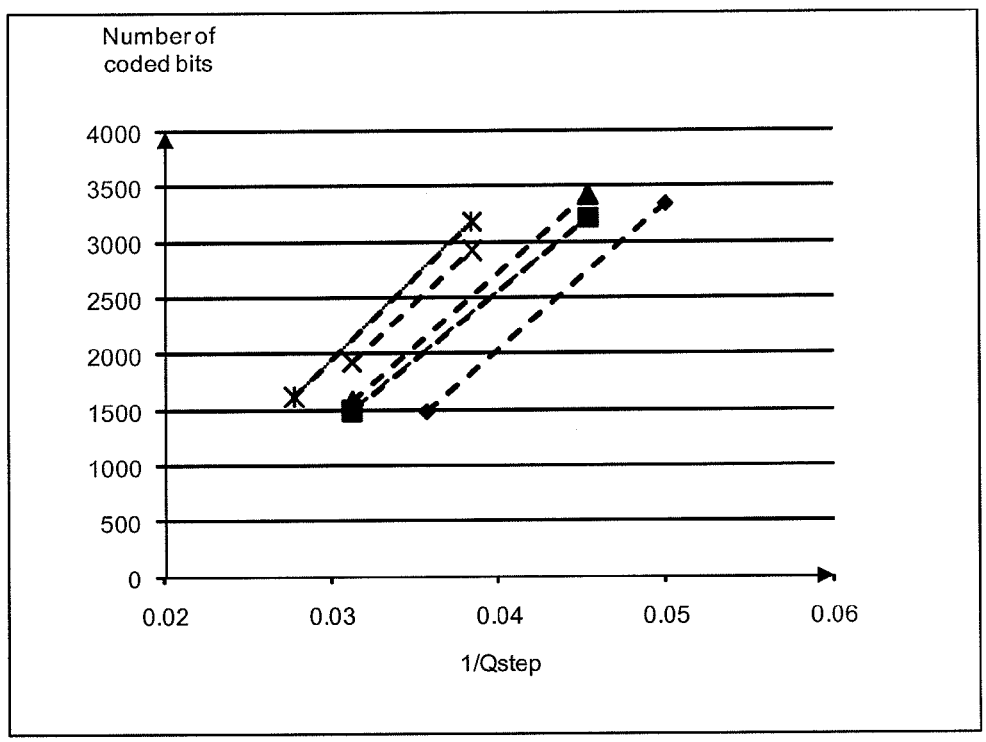
FIG. 9B illustrates similar approximately linear relationships for successive frames according to an embodiment of the present invention.

FIG. 9B shows that successive frames in the same clip exhibit the linear relationships and that the trend lines are nearly parallel for successive frames. The same result is seen across I frame and P frames. This is because that the similarity of successive frames is usually very high on a short timeframe. This shows that the gradients of the linear relationship are similar for successive frames. This implies that the gradient of past frames can be used in the linear model of the current frame (and future frames).

Based on this linear relationship, one embodiment of the invention can provide a rate control algorithm that can adaptively predict a QP with which to encode a frame in a reduced number of iterations for a given bit budget. The rate control algorithm can be based on the architecture illustrated in FIG. 8. After an encoding iteration for a frame finishes and if the number of bytes produced by this encoding iteration is not in the range of the target bit budget, an adjusted QP can be calculated and used in the subsequent iteration of the same frame.

Figure 10:
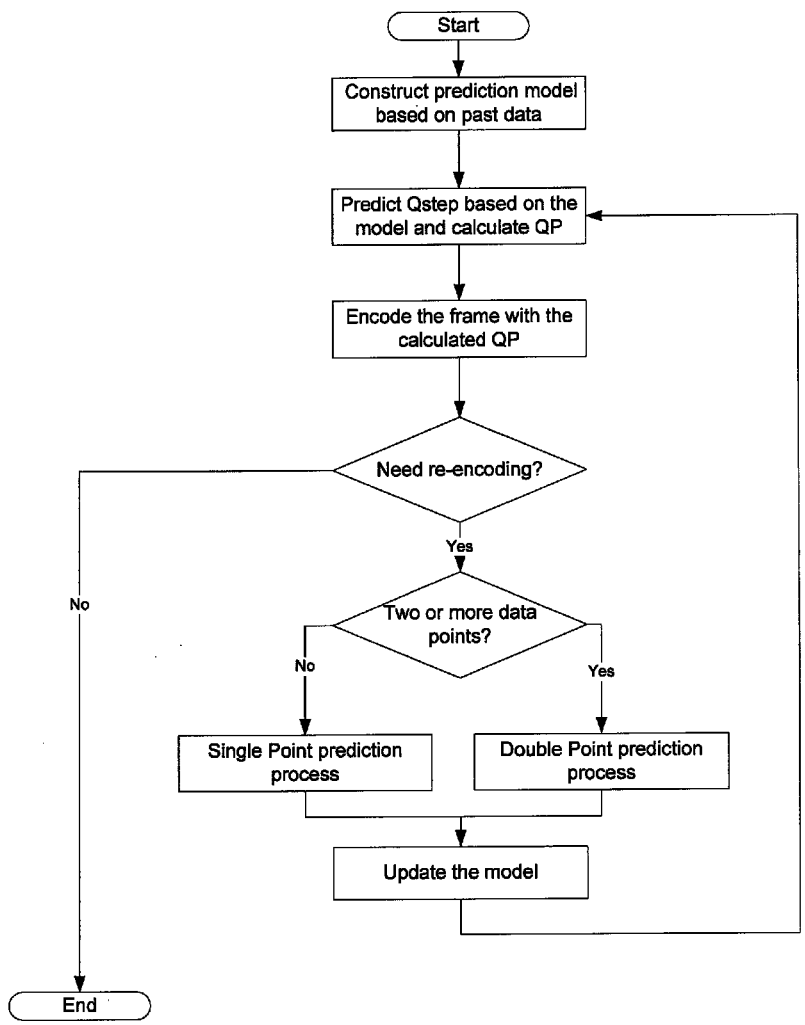
FIG. 10 illustrates an algorithm for encoding a frame using a predicted quality parameter according to an embodiment of the present invention.

One embodiment of the invention follows the algorithm in the flow chart of FIG. 10. Before encoding a frame, the linear model of the current frame is constructed. The linear model parameters denoted as G(0) and C(0) can be obtained from a past frame or frames. They can be the same ones used in a previous frame, or they can be calculated based on a sliding window of some past frames. Once the linear model is constructed, an initial QP step size denoted as $Q_{step}(0)$ can be predicted for the current target bit budget, denoted as CurrBitBudget. $Q_{step}(0)$ can be calculated by the formula: $Q_{step}(0)=G(0)/(CurrBitBudget-C(0))$. The initial QP calculated from the predicted initial $Q_{step}(0)$ can be used for the first iteration of encoding the current frame. The QP can be calculated by using the formula: $QP=4+6*Log_2(Q_{step}(1))$. After the first iteration of encoding is complete, it needs to be determined whether re-encoding is desired by some criteria. An example criterion is comparing the number of coded bits with the frame budget bits according to some threshold. If it is determined to do re-encoding, a single point linear prediction process can be used to predict the next QP. If the frame has been encoded two or more times, a double point linear prediction process can be used to predict the next QP. If there are no past linear model parameters available for the current frame, for example, the current frame is the first frame of the sequence, both prediction gradient G and constant C should be calculated. The frame can be encoded with two different QP respectively associated with their own prediction safe $Q_{step}$. After this, two data points can be obtained and a new linear model can be formed.

Figure 11A:
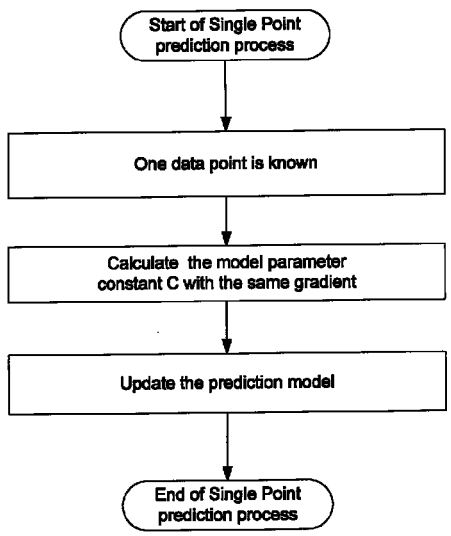
FIG. 11A illustrates an algorithm for single point linear prediction process according to an embodiment of the present invention.

One embodiment of the invention follows the algorithm illustrated in FIG. 11A for the single point linear prediction process. This process can be used to find the QP for the next iteration of encoding after we have a single data point available for the current frame comprising the actual number of coded bits R(0) by using the initial $Q_{step}(0)$. The linear model of the current frame can be updated by using this data point. In this process, the prediction gradient G can remain the same and only C is updated because the prediction gradient is similar for successive frames. The linear parameter C can be calculated as: $C=R(0)-G*(1/Q_{step}(0))$. Based on the updated linear model, the next QP step size denoted as $Q_{step}(1)$ can be calculated for the next iteration by using the formula: $Q_{step}(1)=G/(CurrBitBudget-C)$. The following iteration's QP then can be calculated from $Q_{step}(1)$.

Figure 11B:
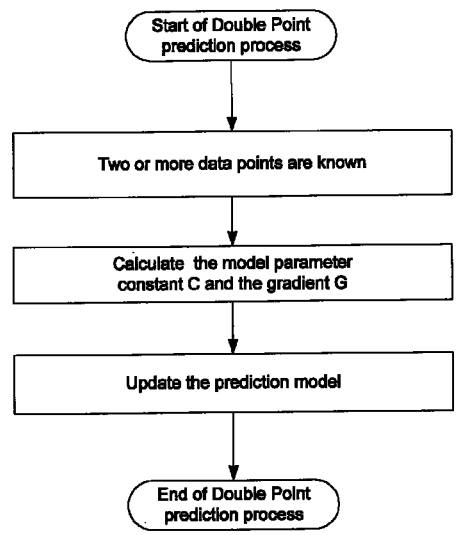
FIG. 11B illustrates an algorithm for double point linear prediction process according to an embodiment of the present invention.

One embodiment of the invention follows the algorithm illustrated in FIG. 11B for the double point linear prediction process. This process is used to find QP in cases where the frame is encoded two or more times, or if two or more reliable data points are available in total even if from a previous frame, such that two or more data points are available for the current frame and a more accurate linear prediction model can be formed. If two data points $(R(0), Q_{step}(0))$ and $(R(1), Q_{step}(1))$ are available. The prediction gradient G and C can be calculated by solving the linear equations $R(0)=G*(1/Q_{step}(0))+C$ and $R(1)=G*(1/Q_{step}(1))+C$. This linear model can be used for the prediction of the next QP and be updated recursively with the data points obtained in the subsequent iterations. All data points obtained in the current frame can be used to get a more accurate linear prediction model. If the linear model of the current frame is formed by two or more data points from the current frame, the model can be used for the initial single point linear prediction process of the next frame.

According to one embodiment of the invention, the linear model can be used not only to predict QP for a given target bit budget, but also predict the coded bits for a given QP. After finishing encoding of the current iteration, if the number of coded bits is smaller than the lower threshold of a predetermined bit budget range, the frame will be re-encoded with a smaller QP for higher video quality. Before doing the actual re-encoding, the number of bits that would be used to code with the smaller QP can be predicted by using the linear model. If the predicted number of coded bits is greater than the maximum of the predetermined bit budget range, it is not necessary to re-encode the frame again with this QP because it is likely to go over the bit budget. This QP can then be excluded for the next iteration of encoding. If the predicted number of coded bits for current QP minus one is already higher than the maximum limit, the re-encoding process can be terminated early.

According to one embodiment of the invention, after a QP is calculated from the predicted $Q_{step}$, the QP can be clipped to a range that makes the absolute difference of the current QP and the last QP less than a threshold. The threshold can be used to limit the impact of any prediction error and the differences in perceptual quality. For the initial QP of the frame that there is no previous encoding QP, the final QP of the last frame can be used. The threshold can be determined by statistical data of many video clips. One such threshold is 10 and other models may use different threshold numbers or range determinations. Another way to minimize prediction error can be to use only the prediction safe $Q_{step}$ to update the linear prediction model.

According to one embodiment of the invention, the linear model can be fully updated regularly with two or more data points from the same frame. It could happen that for many consecutive frames the encoding is only performed once, which means the prediction gradient is unchanged since last update. With the interval to the last update getting longer, the linear model tends to become less accurate. A regular update can refresh the linear model and give better prediction. The regular update interval can be linked to a key frame interval or major scene change frame where the video normally loses its continuity.

According to one embodiment of the invention, the rate control algorithm can cap the maximum number of $Q_{step}$ predictions. This is to avoid prediction oscillation that the linear model only has the accuracy to predict values of $Q_{step}$ either smaller or greater the real value. If the number of prediction exceeds the maximum, the algorithm can start to fine tune QP by the smallest step of QP or by another fine grained search method.

The rate control algorithm can also be used in the generic CBR rate control where the frame budget is not a hard limit and some fluctuation is allowed. The generic CBR rate control may use a sliding window to analyze a group of picture to determine the frame budget and the frame budget may change during the encoding.

One embodiment of the invention uses other non-linear prediction models to predict the next $Q_{step}$. The non-linear prediction models can be formed by feeding some input data, such as past frame number, picture type, $Q_{step}$, actual bitstream size and so on, to neural network, decision tree, recursive filter, weighting filter or other learning processes. The input data can be obtained from a sliding window of current or past frames. Models can also be pre-trained using a training set made from representative clips, and the parameters for non-linear models can be found. The models can be updated once at the beginning of the encoding process, or regularly at a fixed interval, or dynamically for every new set of data or dynamically if some measurements indicate that the update is needed.

An embodiment of the invention provides a method for reusing of motion estimation information in an encoding process. This method can be used by itself or can be used in an iterative encoding method as further detailed throughout the present specification. A benefit of this embodiment is that the performance of the iterative encoding is improved by selectively skipping Motion Estimation (ME) after the first iteration.

An iterative technique encodes a frame once and if the quality or bitrate does not meet the requirements then another pass of encoding is done using some information from the previous iteration. Generally the information that is varied is the QP of the frame/macroblocks across multiple iterations.

Figure 12:
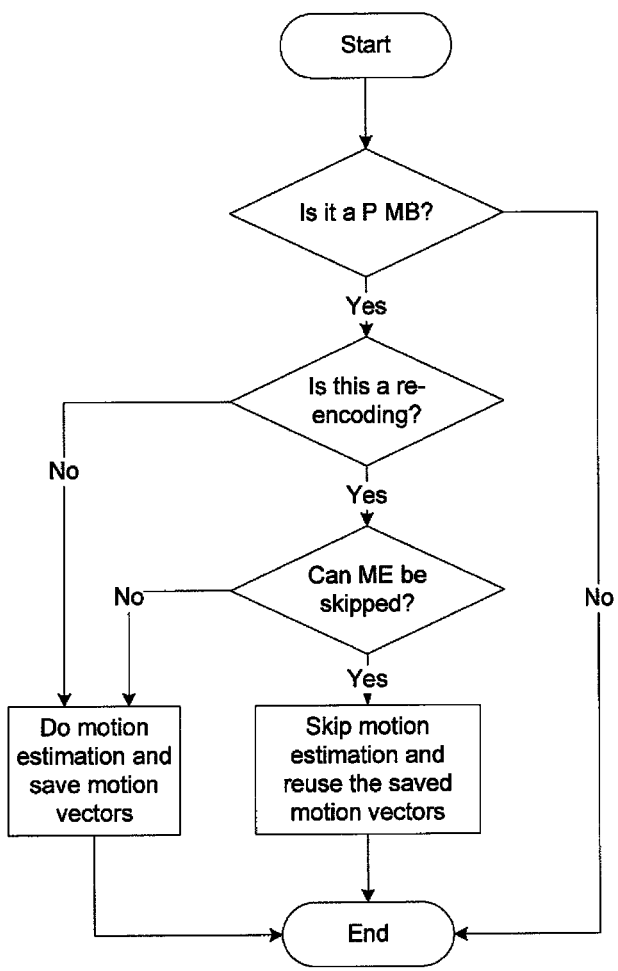
FIG. 12 illustrates an algorithm for encoding a macroblock reusing motion vectors according to an embodiment of the present invention.

FIG. 12 shows the flow chart of skipped Motion Estimation iterative encoding. In normal iterative encoding the encoding process including Motion Estimation, Motion Compensation, Intra Coding, DCT, Quantization, Variable length coding, Inverse quantization and Inverse DCT is to be performed multiple times. The Motion Vectors (MV) collected in the previous encoding of the frame can reused in the current iteration, so the computationally intensive motion estimation (ME) can be skipped to save CPU cycles.

The decision to reuse MV or not can be made based on the quality difference, or some other factor. A quality difference measure can be determined by the QP difference between the previous iteration and the current iteration of the frame. If the QP difference between the previous pass and the current pass is greater than some defined threshold, it means that the MV is likely to change in this pass. One such threshold is two. The ME process can still be performed to maintain the video quality. If QP difference is smaller than the threshold, the ME process can then be skipped and the motion vector can be reused.

In accordance with the above description, an embodiment of the present invention includes a method of transmitting a coded media frame. In one embodiment the coded media frame may be transmitted by a network infrastructure device. The method may include determining a plurality of media frame sizes including a media frame size, transmitting an element comprising the plurality of media frame sizes, and/or receiving an input media frame. The method may also include processing the input media frame according to the media frame size to provide a coded media frame and/or transmitting the coded media frame. In one embodiment this may occur in a controller, a media processing module or a media adaptation module.

Another embodiment of the present invention includes an apparatus for transmitting a coded media frame. In one embodiment the apparatus may include a network infrastructure device. The apparatus may include means for determining a plurality of media frame sizes including a media frame size, means for transmitting an element comprising the plurality of media frame sizes, and/or means for receiving an input media frame. The apparatus may also include means for processing the input media frame according to the media frame size to provide a coded media frame and/or means for transmitting the coded media frame. In one embodiment the apparatus may include a controller, a media processing module or a media adaptation module.

Another embodiment of the present invention includes a method of producing coded media. In one embodiment the coded media may be produced by a network infrastructure device. The method may include determining a media coding pattern comprising a plurality of frame sizes and/or producing a plurality of coded media samples in accordance with the plurality of frame sizes. In one embodiment this may occur in a controller, a media processing module or a media adaptation module.

Another embodiment of the present invention includes an apparatus for producing coded media. In one embodiment the apparatus may include a network infrastructure device. The apparatus may include means for determining a media coding pattern comprising a plurality of frame sizes and/or means for producing a plurality of coded media samples in accordance with the plurality of frame sizes. In one embodiment the apparatus may include a controller, a media processing module or a media adaptation module.

Another embodiment of the present invention includes a method of estimating a quantization step parameter for use in a video encoding process. In one embodiment the quantization step parameter may be estimated by a network infrastructure device. The method may include providing a gradient and a constant, wherein the gradient and the constant relate a first data size of a first coded video frame to the inverse of a first quantization step, and/or providing a target bitstream size. The method may also include estimating a second quantization step using at least the target bitstream size, the gradient and the constant, and/or producing a second coded video frame using the second quantization step. In one embodiment this may occur in a controller, a media processing module or a media adaptation module.

Another embodiment of the present invention includes an apparatus for estimating a quantization step parameter for use in a video encoding process. In one embodiment the apparatus may include a network infrastructure device. The apparatus may include means for providing a gradient and a constant, wherein the gradient and the constant relate a first data size of a first coded video frame to the inverse of a first quantization step, and/or means for providing a target bitstream size. The apparatus may also include means for estimating a second quantization step using at least the target bitstream size, the gradient and the constant, and/or means for producing a second coded video frame using the second quantization step. In one embodiment this may occur in a controller, a media processing module or a media adaptation module.

Another embodiment of the present invention includes a method of iteratively encoding one or more macroblocks in a video frame reusing motion estimation information. In one embodiment the one or more macroblocks may be encoded by a network infrastructure device. The method may include encoding the one or more macroblocks using a first quality parameter, producing one or more coded macroblocks, one or more motion vectors for the one or more macroblocks and a bitstream size associated with at least the one or more coded macroblocks. The method may also include determining a second encoding is to be performed based in part on a target bitstream size, providing a second quality parameter, and/or encoding the one or more motion vectors, producing one or more second coded macroblocks. In one embodiment this may occur in a controller, a media processing module or a media adaptation module.

Another embodiment of the present invention includes an apparatus for iteratively encoding one or more macroblocks in a video frame reusing motion estimation information. In one embodiment the apparatus may include a network infrastructure device. The apparatus may include means for encoding the one or more macroblocks using a first quality parameter, producing one or more coded macroblocks, one or more motion vectors for the one or more macroblocks and a bitstream size associated with at least the one or more coded macroblocks. The apparatus may also include means for determining a second encoding is to be performed based in part on a target bitstream size, means for providing a second quality parameter, and/or means for encoding the one or more motion vectors, producing one or more second coded macroblocks. In one embodiment this may occur in a controller, a media processing module or a media adaptation module.

According to an embodiment of the present invention, an apparatus for adapting media content in one or more networks is provided. The apparatus includes a controller module, one or more network interface modules, and one or more protocol interface modules coupled to the controller module. The apparatus also includes a script interpretation module coupled to the controller module, one or more media adaptation modules coupled to the controller module, and a management interface module coupled to the controller module.

According to an embodiment of the present invention, an apparatus for providing multimedia content adaptation from multiple formats and qualities to multiple other formats and qualities over a range of networks and transport protocols is provided. The apparatus allows the adaptation of multimedia content from a variety of formats to a variety of other formats in a resource efficient manner. The apparatus allows multimedia content to be stored in a convenient format and accessed from any presentation device through the adaptation of that content. The apparatus is also scalable with demand.

Embodiments of the present invention are systems or apparatuses that include one or more processing units (such as digital signal processors (DSPs), FPGA/ASICs or general purpose processors), one or more memories, an operating system or systems (to allow access to the different hardware resources), a bus with a bus control unit, and a resources control unit.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of efficiently transmitting a coded media frame, the method comprising:
    estimating, at an encoder system, a plurality of media frame sizes for a plurality of media frames of a media stream, wherein the plurality of media frame sizes are estimated based on one or more characteristics of the media stream;
    generating, at the encoder system, an element comprising the estimated plurality of media frame sizes;
    transmitting, by the encoder system, the element comprising the estimated plurality of media frame sizes to a client device;
    receiving, at the encoder system, an input media frame of the plurality of media frames after the transmission of the element;
    processing, at the encoder system, the input media frame according to the corresponding estimated media frame size to provide a coded media frame, wherein the estimated media frame size corresponding to the input media frame is identified from the plurality of estimated media frame sizes of the transmitted element; and
    transmitting, by the encoder system, the coded media frame to the client device, wherein the client device comprises the element comprising the estimated media frame size corresponding to the received coded media frame,
    wherein processing the input media frame comprises conducting a subpart of an encoding process, storing one or more coefficients for two or more macroblocks from the subpart of an encoding process, applying quantization and run-length encoding on the stored coefficients to produce a subpart of the coded media frame,
    wherein processing the input media frame comprises applying a different quantization and run-length encoding on the one or more coefficients of the two or more macroblocks to produce the coded media frame; wherein the coded media frame has a size within threshold of the corresponding estimated media frame size identified from the plurality of estimated media frame sizes of the transmitted element.

2. The method of claim 1 wherein the input media frame comprises a Video frame.

3. The method of claim 1 wherein processing the input media frame comprises encoding the input media frame and using padding media to produce the coded media frame according to the corresponding estimated media frame size identified from the plurality of estimated media frame sizes of the transmitted element.

4. The method of claim 1 wherein processing the input media frame comprises encoding the input media frame to produce a second coded media frame, testing if the size of the second coded media frame is within a threshold and if not re-encoding the input media frame with a modification of an encoding process to produce the coded media frame.

5. The method of claim 1 wherein the element and the coded media frame form a part of a file compliant to a container format; the container format selected from the group consisting of FLV; 3GP; MP4 and MOV.

6. The method of claim 1 wherein a 'moov' box comprises the element and 'mdat' box comprises the coded media frame.

7. The method of claim 1 wherein transmitting the element is in response to a first HTTP partial content request and transmitting the coded media frame is in response to a second HTTP request.

8. An encoding apparatus for efficiently transmitting a coded media frame, the apparatus comprising:
    means for estimating a plurality of media frame sizes for a plurality of media frames of a media stream, wherein the plurality of media frame sizes are estimated based on one or more characteristics of the media stream;
    means for generating an element comprising the estimated plurality of media frame sizes;
    means for transmitting the element comprising the estimated plurality of media frame sizes to a client device;
    means for receiving an input media frame of the plurality of media frames after the transmission of the element;
    means for processing the input media frame according to the corresponding estimated media frame size to provide a coded media frame, wherein the estimated media frame size corresponding to the input media frame is identified from the plurality of estimated media frame sizes of the transmitted element; and
    means for transmitting the coded media frame to the client device, wherein the client device comprises the element comprising the estimated media size corresponding to the received coded media frame,
    wherein the means for processing the input media frame comprise means for conducting a subpart of an encoding process, storing one or more coefficients for two or more macroblocks from the subpart of an encoding process, means for applying quantization and means for run-length encoding on the stored coefficients to produce a subpart of the coded media frame,
    wherein the means for processing the input media frame comprise means for applying a different quantization and run-length encoding on the one or more coefficients of the two or more macroblocks to produce the coded media frame, wherein the coded media frame has a size within threshold of the corresponding estimated media frame size identified from the plurality of estimated media frame sizes of the transmitted element.

9. The apparatus of claim 8 wherein the input media frame comprises a Video frame.

10. The apparatus of claim 8 wherein the means for processing the input media frame comprise means for encoding the input media frame and using padding media to produce the coded media frame according to the corresponding estimated media frame size identified from the plurality of estimated media frame sizes of the transmitted element.

11. The apparatus of claim 8 wherein the means for processing the input media frame comprise means for encoding the input media frame to produce a second coded media frame, testing if the size of the second coded media frame is within a threshold and if not re-encoding the input media frame with a modification of an encoding process to produce the coded media frame.

12. The apparatus of claim 8 wherein the element and the coded media frame form a part of a file compliant to a container format, the container format selected from the group consisting of FLV, 3GP, MP4 and MOV.

13. The apparatus of claim 8 wherein a 'moov' box comprises the element and 'mdat' box comprises the coded media frame.

14. The apparatus of claim 8 wherein transmitting the element is in response to a first HTTP partial content request and transmitting the coded media frame is in response to a second HTTP request.

* * * * *